(No Model.)
A. A. LONG.
PNEUMATIC TIRE.
No. 505,919. Patented Oct. 3, 1893.
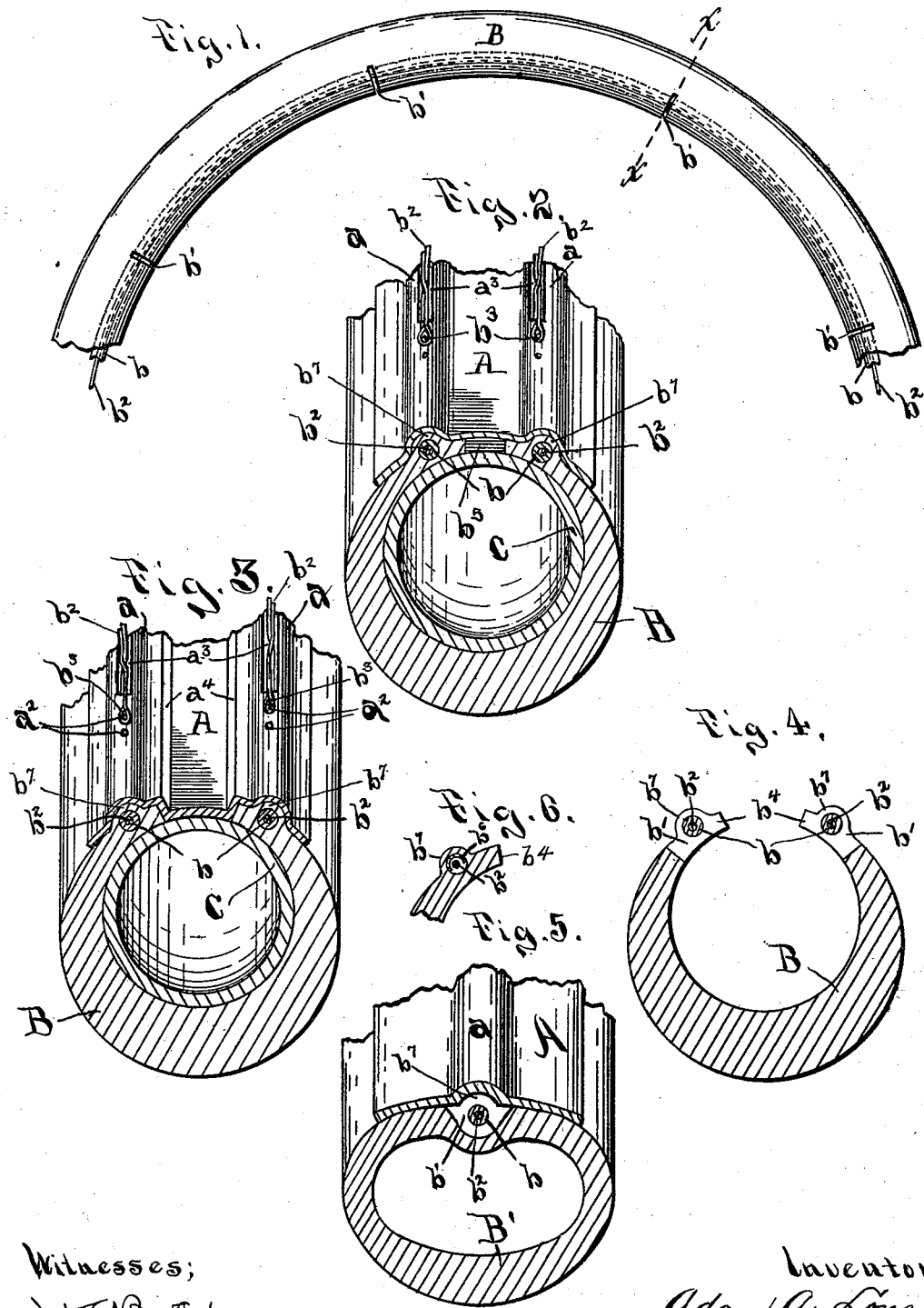
Witnesses:
H. E. Bates
M. W. McRoden
Inventor,
Adam A. Long,
By Howard L. Osgood,
Atty.

UNITED STATES PATENT OFFICE.

ADAM A. LONG, OF ROCHESTER, NEW YORK, ASSIGNOR OF ONE-HALF TO HENRY S. DURAND, OF SAME PLACE.

PNEUMATIC TIRE.

SPECIFICATION forming part of Letters Patent No. 505,919, dated October 3, 1893.

Application filed February 18, 1893. Serial No. 462,926. (No model.)

*To all whom it may concern:*

Be it known that I, ADAM A. LONG, a citizen of the United States, and a resident of the city of Rochester, in the county of Monroe and State of New York, have invented certain new and useful Improvements in Pneumatic Tires for Wheels, of which the following is a specification, reference being had to the accompanying drawings, in which—

Figure 1, is a side elevation of a portion of an outer shoe, constructed according to my invention. Fig. 2, is a transverse section through a pneumatic tire constructed according to my invention. Fig. 3, is a transverse section of such a pneumatic tire having another form of wheel rim. Fig. 4, is an enlarged sectional view on the line $x$—$x$ of Fig. 1. Fig. 5, is a transverse section through a modified form of my tire. Fig. 6, is a transverse section through the edge of a shoe, constructed according to my invention, showing a partial, instead of a complete tube therein.

The object of my invention is to provide means for holding a pneumatic tire firmly in place on the rim of a wheel but easily removable therefrom and it consists in the device hereinafter described and claimed.

In the drawings my device is illustrated as applied to the rim of a bicycle wheel.

A, is the rim of a wheel provided with two parallel peripheral grooves $a$ $a$.

B, is the outer india-rubber shoe used to cover and protect the inner or pneumatic tube C. This shoe, I prefer to make of a partial tube as shown in Fig. 4.

Before vulcanizing the shoe I insert a small metallic tube $b$, preferably of copper, in each edge, which extends lengthwise throughout the whole circumference of the shoe. The india-rubber shoe B is then vulcanized and firmly incloses the tubing $b$ $b$ within its substance. After vulcanizing, I cut a series of slots $b'$ into the shoe, which extend so far inward as to sever each tube $b$ into a series of sections of suitable length, having contiguous ends. (See Fig. 1.) The shoe then becomes flexible at the points where the tubing is severed and at these points may be bent or stretched to a reasonable extent. A wire $b^2$ is then inserted through one of the slots $b'$ into each tube and may be pushed in through the whole circumference of the shoe. The ends of the wire $b^2$ are now free and the shoe B with its pneumatic tire C may be easily placed upon the rim of a wheel, the rubber of the shoe stretching at the several slots sufficiently for that purpose. Along the line where the tube $b$ is inserted there is a projection $b^7$ which is adapted to fit into the groove $a$. When a wire $b^2$ is tightened it will slip easily within the tube $b$ and, when the ends are fastened will hold the shoe rigidly in position compressing the projection $b^7$ into the groove $a$. In order to fasten the ends of the wire $b^2$, I cut a slot $a^3$ through each groove $a$ of the rim A, and pass the ends of the wire through the slot so that the ends of the wire project on the inside of the rim. I provide pegs or pins $a^2$ on the inside of the groove $a$ of the rim A and make a loop $b^3$ on each end of the wire $b^2$ which I catch over the pins on each side. The wire may be tightened to different degrees by providing a series of pins $a^2$ $a^2$ as shown in Figs. 2 and 3, but other tightening means may be employed without departing from my invention. The use of the tube $b$ is mainly to form a support for the wire $b^2$ when the same is drawn tight, since if a wire is pulled through an unprotected hole in the rubber it will tend to cut the rubber and it will be difficult to produce a uniform pressure or tightening of the wire all around the shoe, because the wire will not slip on the rubber. In the tube, however, the wire will slip freely and the large size of the tube will prevent any cutting of the shoe when the wire is pulled tight. The tube may not be complete but may be partial, as shown at $b^6$ in Fig. 6.

The shoe may compose the inflated tube as shown in Fig. 5, in which B' is the pneumatic tube; and a single tubular tire may be used with a single groove in the rim as shown in said Fig. 5.

The rim of the wheel A may be provided with shoulders $a^4$ as shown in Fig. 3, against which the ends $b^4$ of the shoe abut, or the rim may be flat at the middle as shown in Fig. 2, and a filling piece $b^5$ of any suitable material may be inserted between the ends $b^4$ of the shoe.

The usual means of inflating the pneumatic tube are provided.

What I claim is—

1. The combination in a wheel, of a wheel rim grooved around the periphery, a tubular tire, sections of tubing having contiguous ends inclosed within the material of the tire, continuous wire inserted within the tubing, means for contracting the wire and for releasably fastening the same whereby the tire is compressed into the grooved rim and is thereby held thereon, substantially as described.

2. The combination in a wheel, of a wheel rim having two peripheral grooves, an inflatable tube, a shoe inclosing the same, two tubes divided into sections and inclosed within the material of the shoe, wires inserted into and throughout the divided tubes and adjustable fastenings for the ends of the wires whereby the wires are contracted and the shoe is compressed into the grooves along the lines of the divided tubes and is thereby held on the rim, substantially as described.

3. The combination in a wheel of a wheel rim having two peripheral grooves, an inflatable tube, a shoe consisting of a partial tube inclosing the inflatable tube, two tubes divided into sections and inclosed within the material of the shoe, a wire, having free ends, inserted in and extending throughout each of said divided tubes, and means for adjustably fastening the ends of each wire to said rim, substantially as described.

ADAM A. LONG.

Witnesses:
S. P. MOORE,
A. N. BOWMAN.